(12) United States Patent
Ge et al.

(10) Patent No.: US 12,233,716 B2
(45) Date of Patent: Feb. 25, 2025

(54) AUTOMOTIVE ELECTRIC DRIVE WITH THREE PHASE COUPLED INVERTER

(71) Applicant: Ford Global Technologies, LLC, Dearborn, MI (US)

(72) Inventors: Baoming Ge, Okemos, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 356 days.

(21) Appl. No.: 17/951,496

(22) Filed: Sep. 23, 2022

(65) Prior Publication Data

US 2024/0100959 A1 Mar. 28, 2024

(51) Int. Cl.
*B60L 15/00* (2006.01)
*B60L 3/00* (2019.01)
*B60L 53/14* (2019.01)
*B60L 53/24* (2019.01)
*H02M 1/12* (2006.01)
*H02M 7/487* (2007.01)
*H02M 7/5387* (2007.01)

(52) U.S. Cl.
CPC ............ *B60L 15/007* (2013.01); *H02M 1/123* (2021.05); *H02M 7/487* (2013.01); *H02M 7/5387* (2013.01); *B60L 3/003* (2013.01); *B60L 53/14* (2019.02); *B60L 53/24* (2019.02)

(58) Field of Classification Search
CPC ........ B60L 3/003; B60L 15/007; B60L 53/14; B60L 53/24; H02M 1/123
See application file for complete search history.

(56) References Cited

U.S. PATENT DOCUMENTS

| | | | |
|---|---|---|---|
| 9,742,275 B2 | 8/2017 | Chen | |
| 10,230,254 B1* | 3/2019 | Najmabadi | ............. H02P 27/06 |
| 2018/0241337 A1* | 8/2018 | Zou | .......................... B60L 3/003 |
| 2018/0367025 A1* | 12/2018 | Rasek | ................... H02M 1/126 |
| 2019/0031041 A1* | 1/2019 | Rozman | ................. B60L 58/10 |
| 2019/0126763 A1* | 5/2019 | Najmabadi | ............. B60L 53/24 |
| 2019/0366850 A1* | 12/2019 | Ge | ........................... B60L 53/22 |

FOREIGN PATENT DOCUMENTS

| | | |
|---|---|---|
| CN | 103368435 A | 10/2013 |
| WO | 2010059141 A1 | 5/2010 |

* cited by examiner

*Primary Examiner* — Gary A Nash
(74) *Attorney, Agent, or Firm* — David B. Kelley; Brooks Kushman P.C.

(57) ABSTRACT

A vehicle power system includes an inverter electrically connected between a traction battery and electric machine, a three phase coupled inductor electrically connected between the traction battery and inverter, and one or more controllers that operate the inverter while a common mode voltage at a neutral point of the electric machine is constant.

19 Claims, 7 Drawing Sheets

AUTOMOTIVE ELECTRIC DRIVE WITH THREE PHASE COUPLED INVERTER

TECHNICAL FIELD

This disclosure relates to vehicle power systems and the control thereof.

BACKGROUND

Certain vehicles may be propelled by electric machines that convert electrical energy to mechanical energy.

SUMMARY

A vehicle includes a traction battery, an electric machine, an inverter electrically connected between the traction battery and electric machine, and a three phase coupled inductor electrically connected between the traction battery and inverter. The inverter includes three capacitors and three pairs of series connected switches each defining a phase leg. Each of the capacitors is in parallel with one of the phase legs and electrically connected between the one of the phase legs and electric machine.

The three phase coupled inductor may include three coils. A terminal of each of the coils may be electrically connected between one of the pairs of series connected switches. The vehicle may include a capacitor electrically connected in parallel with the traction battery and between the traction battery and three phase coupled inductor. During operation of the inverter, a common mode voltage at a neutral point of the electric machine may be constant. The vehicle may include one or more controllers that operate the switches while phase to phase voltages of the inverter are greater than or less than a voltage of the battery. The inverter may permit bidirectional power flow.

An automotive electric drive system has an inverter including three pairs of series connected switches each defining a phase leg and three capacitors, and a three phase coupled inductor including three coils. Each of the capacitors is in parallel with one of the phase legs. Each of the coils includes a terminal electrically connected between one of the pairs of series connected switches such that the switches are electrically between the capacitors and three phase coupled inductor. The automotive drive system further has one or more controllers that operate the switches while a voltage input at the three phase coupled inductor is less than a voltage output at the inverter.

The automotive electric drive system may include a traction battery. The three phase coupled inductor may be electrically connected between the inverter and traction battery. The automotive electric drive system may include a capacitor electrically in parallel with the traction battery. The automotive electric drive system may include an electric machine. The inverter may be electrically connected between the three phase coupled inductor and electric machine. During operation of the inverter, a common mode voltage at a neutral point of the electric machine may be constant. The inverter may permit bidirectional power flow. The one or more controllers may further operate the inverter in a six step mode.

A vehicle includes a traction battery, an electric machine, an inverter electrically connected between the traction battery and electric machine, three inductors electrically connected between the traction battery and inverter, and one or more controllers that operate the inverter while a common mode voltage at a neutral point of the electric machine is constant.

The one or more controllers may operate the inverter while phase to phase voltages of the inverter are greater than or less than a voltage of the battery. The inverter may include three capacitors and three pairs of series connected switches each defining a phase leg. Each of the capacitors may be in parallel with one of the phase legs and electrically connected between the one of the phase legs and electric machine. The three inductors may include three coils. A terminal of each of the coils may be electrically connected between one of the pairs of series connected switches. The vehicle may include a capacitor electrically connected in parallel with the traction battery and between the traction battery and three inductors. The inverter may permit bidirectional power flow.

BRIEF DESCRIPTION OF THE DRAWINGS

In the following detailed description, reference is made to the accompanying figures, which form a part thereof, and in which are shown by way of illustration specific embodiments. Other embodiments, of course, are also contemplated and/or described.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
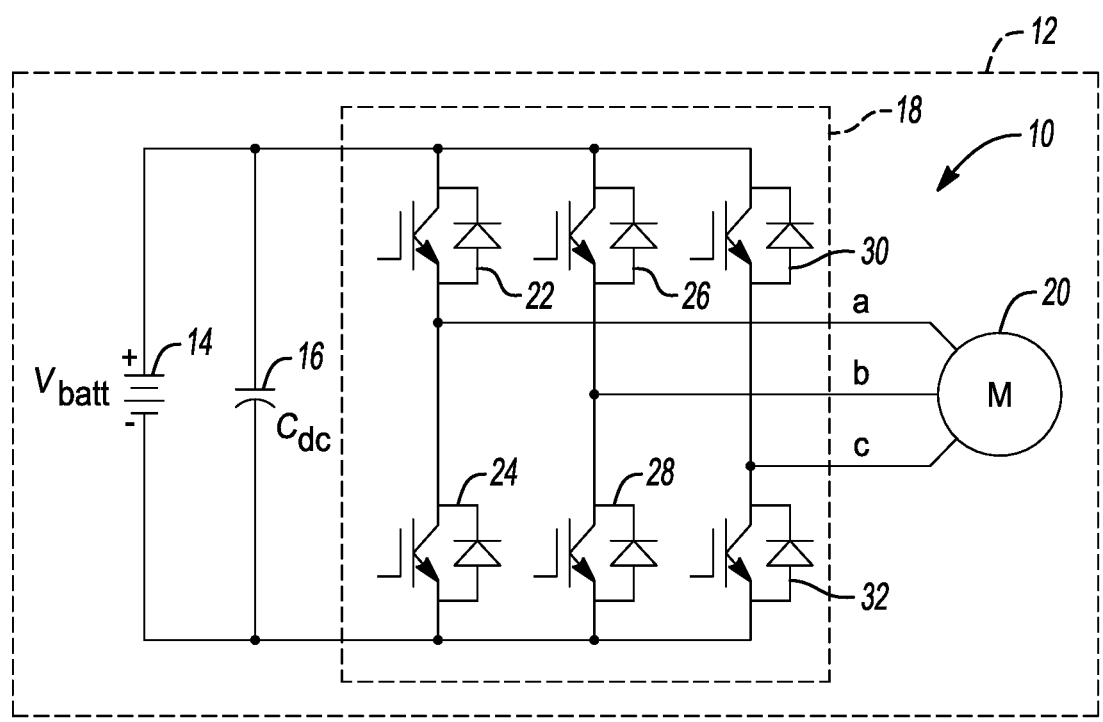
FIGS. 1 and 2 are schematic diagrams of typical electric drive systems.

Referring to FIG. 1, a typical electric drive system 10 for an electric vehicle 12 includes a traction battery 14, a DC link capacitor 16, an inverter 18, and an electric machine 20. The inverter 18 includes a plurality of switches 22, 24, 26, 28, 30, 32. Pairs of the switches 22, 24, 26, 28, and 30, 32 each define a phase leg. The DC link capacitor 16 is in parallel with and electrically between the traction battery 14 and inverter 18. The inverter 18 is electrically between the DC link capacitor 16 and electric machine 20. The traction battery 14 is thus directly connected to the DC link capacitor 16. As a result, the stator voltage of the electric machine 20 is limited by the voltage of the traction battery voltage 14. The voltage of the traction battery 14 will be low at low states of charge, which may lead to lower electric machine drive capability in terms of maximum torque, speed range, and power output.

Figure 2:
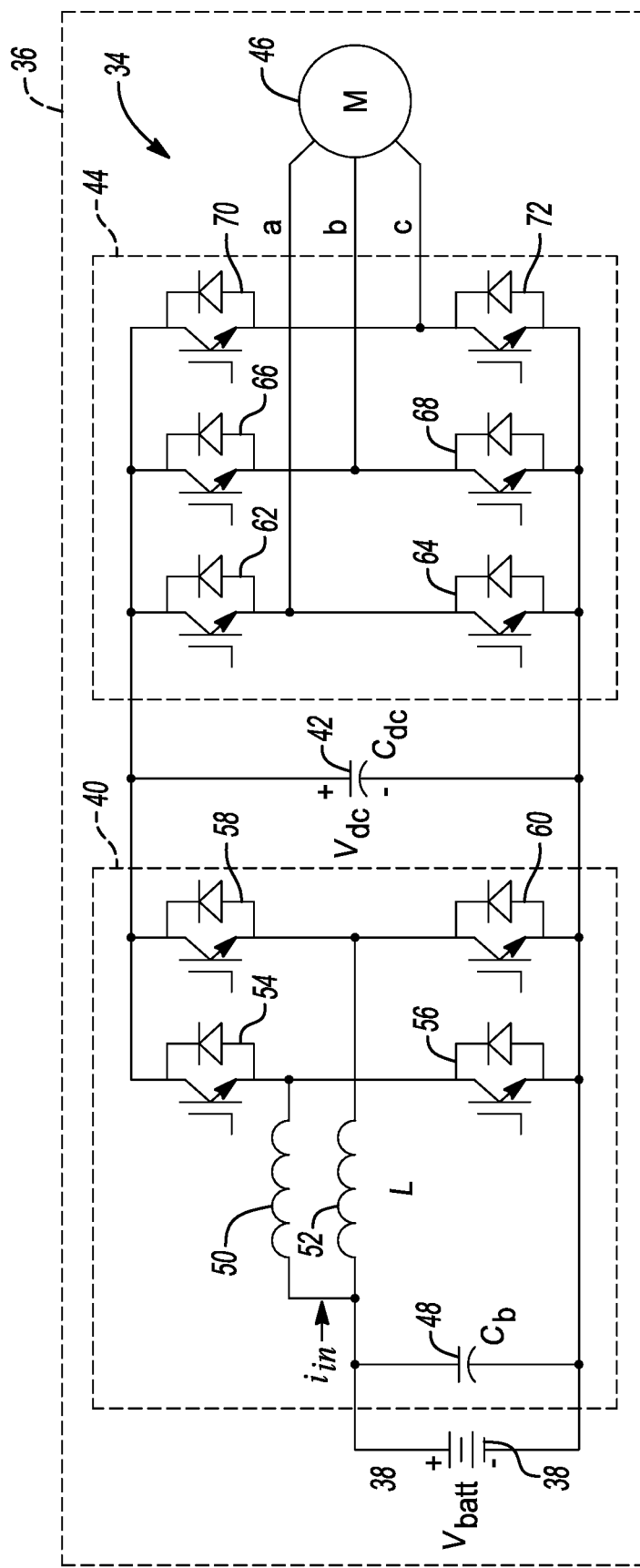

Referring to FIG. 2, another typical electric drive system 34 for an electric vehicle 36 includes a traction battery 38, a variable voltage converter 40, a DC link capacitor 42, an inverter 44, and an electric machine 46. The variable voltage converter includes a capacitor 48, a pair of inductors 50, 52, and switches 54, 56, 58, 60. The inverter 44 includes a plurality of switches 62, 64, 66, 68, 70, 72. Pairs of the switches 62, 64, 66, 68, and 70, 72 each define a phase leg. The variable voltage converter 40 is electrically between the traction battery 38 and DC link capacitor 42. The inverter 44 is electrically between the DC link capacitor 42 and electric machine 46.

The two phase interleaved variable voltage converter 40 can be used to boost voltage. The DC link voltage associated with the DC link capacitor 42 can thus be maintained at a high value even though the voltage of the traction battery 38 may be low at low states of charge. This may ensure high speed range and high power range of the electric machine drive. It also may provide a way to enhance system performance and lower system loss by using low battery voltage and high DC link voltage. Additional power switches and inductors, however, are required to achieve the boost functionality. Additional power loss, system expense, volume, and weight may thus result.

Figure 3:
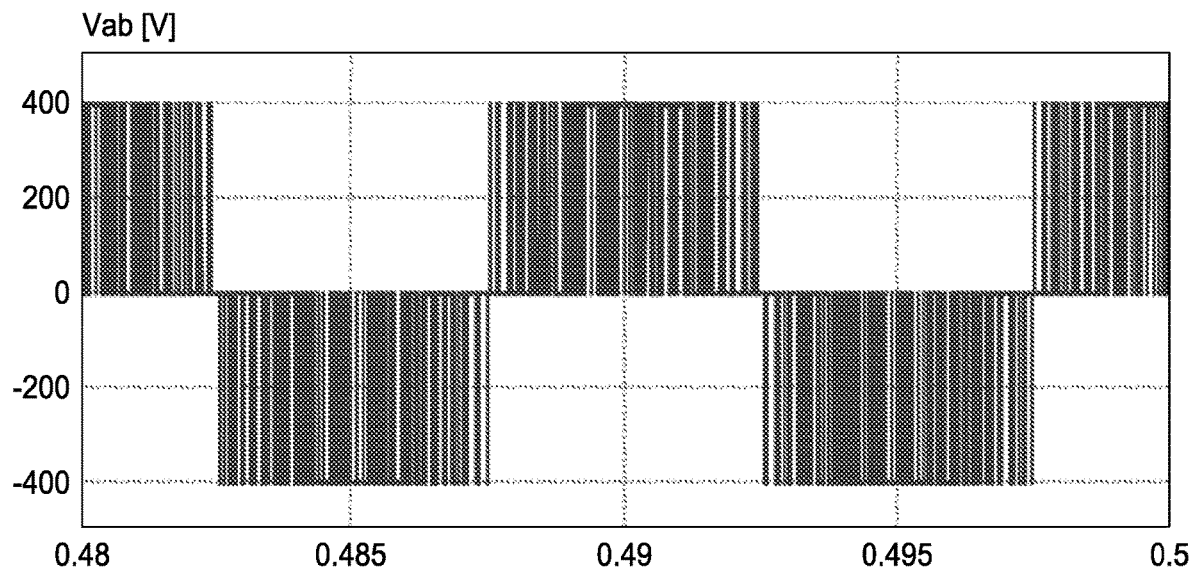
FIG. 3 shows the electric machine phase-to-phase voltage waveforms output from the inverters of FIGS. 1 and 2.
Figure 4:
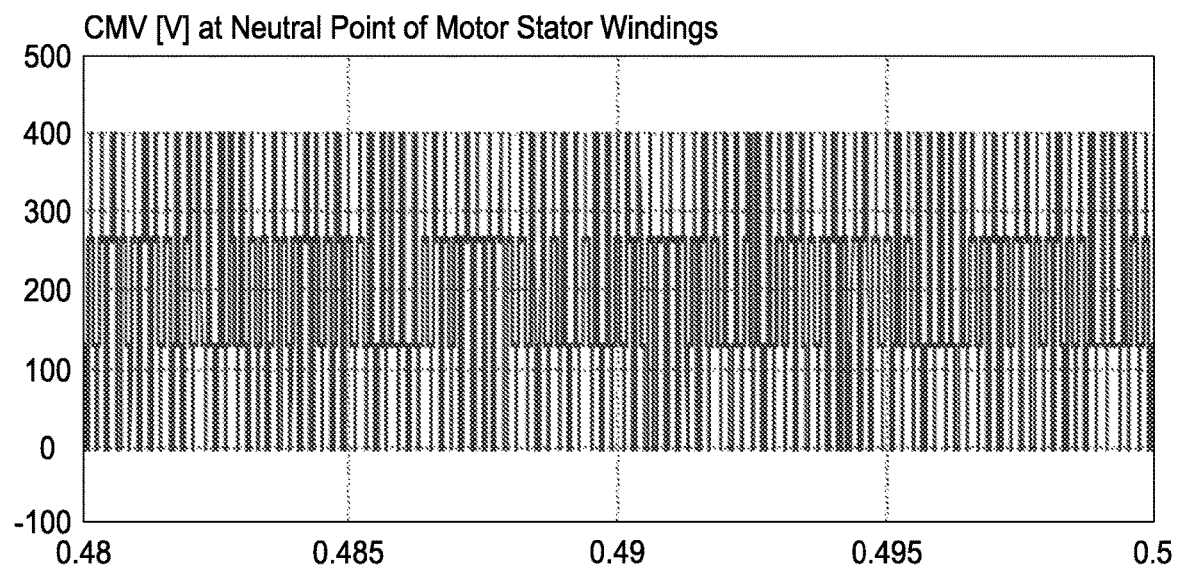
FIG. 4 shows the common mode voltage waveform at the neutral point of the electric machine windings of FIGS. 1 and 2.

The electric drive systems 10, 34 output pulse width modulated voltages to electric machine windings. Referring to FIG. 3, electric machine phase-to-phase voltage waveforms are output from the inverters 18, 44. This voltage waveform may cause issues related to loss, noise, vibration, harshness, insulation, etc. Referring to FIG. 4, the common mode voltage waveform at the neutral point of the electric machine windings has high dv/dt pulse. This may cause issues related to noise, etc.

Figure 5:
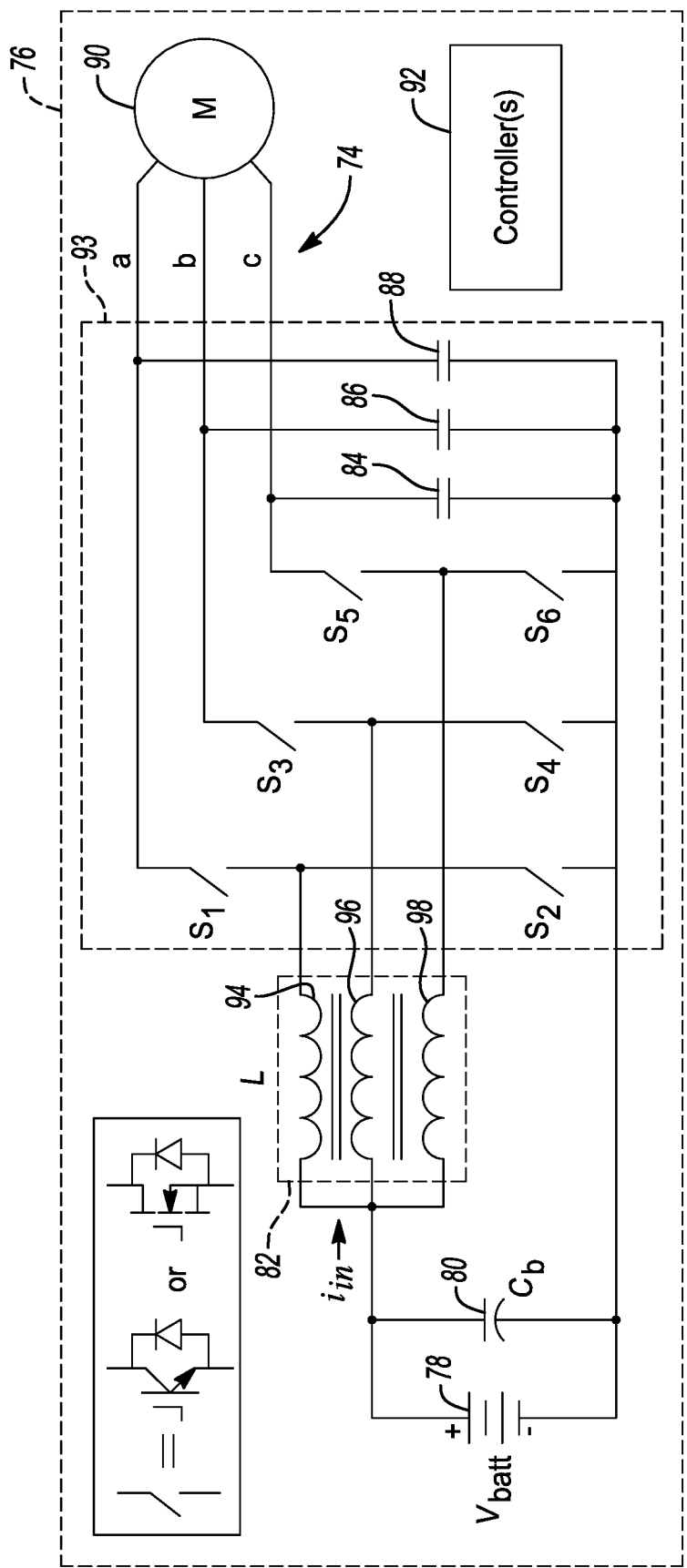
FIG. 5 is a schematic diagram of an electric drive system.

Referring to FIG. 5, an electric drive system 74 for an electric vehicle 76 includes a traction battery 78, a capacitor 80, a three phase coupled inductor 82, switches S1, S2, S3, S4, S5, S6, capacitors 84, 86, 88, electric machine 90, and one or more controllers 92. The switches S1, S2, S3, S4, S5, S6 and capacitors 84, 86, 88 thus constitute inverter 93. The one or more controllers 92 are in communicative control with the switches S1, S2, S3, S4, S5, S6 and electric machine 90. The one or more controllers 92 may use output voltage closed loop control and electric machine control to achieve the desired electric machine operation performance.

The capacitor 80 is in parallel with the traction battery 78. The three phase coupled inductor 82 is electrically between the capacitor 80 and switches S1, S2, S3, S4, S5, S6. The three phase inductor 82 includes three coils 94, 96, 98. A terminal of each of the coils 94, 96, 98 shares a node with the traction battery 78 and capacitor 80. Another terminal of the coil 94 is electrically connected between the switches S1, S2. Another terminal of the coil 96 is electrically connected between the switches S3, S4. Another terminal of the coil 98 is electrically connected between the switches S5, S6. The switches S1, S2 are in series. The switches S3, S4 are in series. The switches S5, S6 are in series. The capacitor 84 is in parallel with the switches S5, S6, and electrically between the switches S5, S6 and electric machine 90. The capacitor 86 is in parallel with the switches S3, S4, and electrically between the switches S3, S4 and electric machine 90. The capacitor 88 is in parallel with the switches S1, S2, and electrically between the switches S1, S2 and electric machine 90.

The electric drive system 74 thus achieves voltage inversion, buck operation, and boost operation in a single stage. There is a wide voltage range to drive the electric machine 90. It needs less power switches than the electric drive systems of FIGS. 1 and 2.

Figure 6:
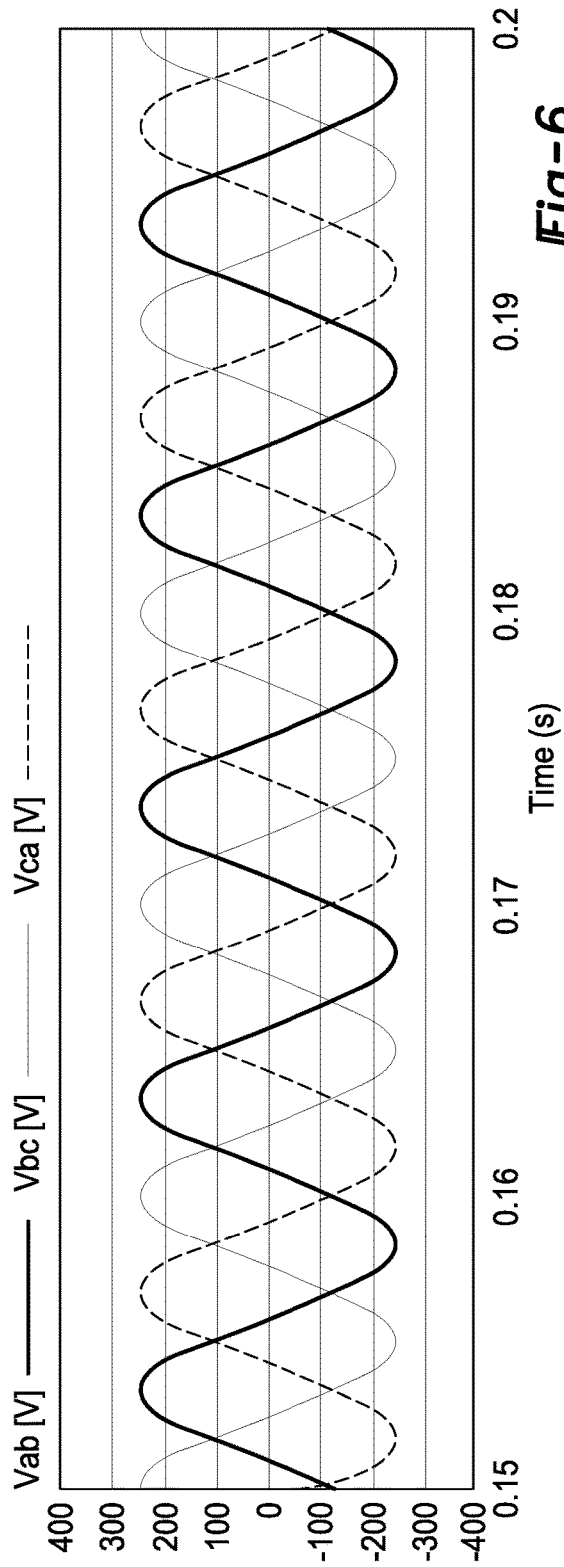
FIG. 6 shows the three phase sinusoidal output voltage waveforms of the inverter of FIG. 5.
Figure 7:
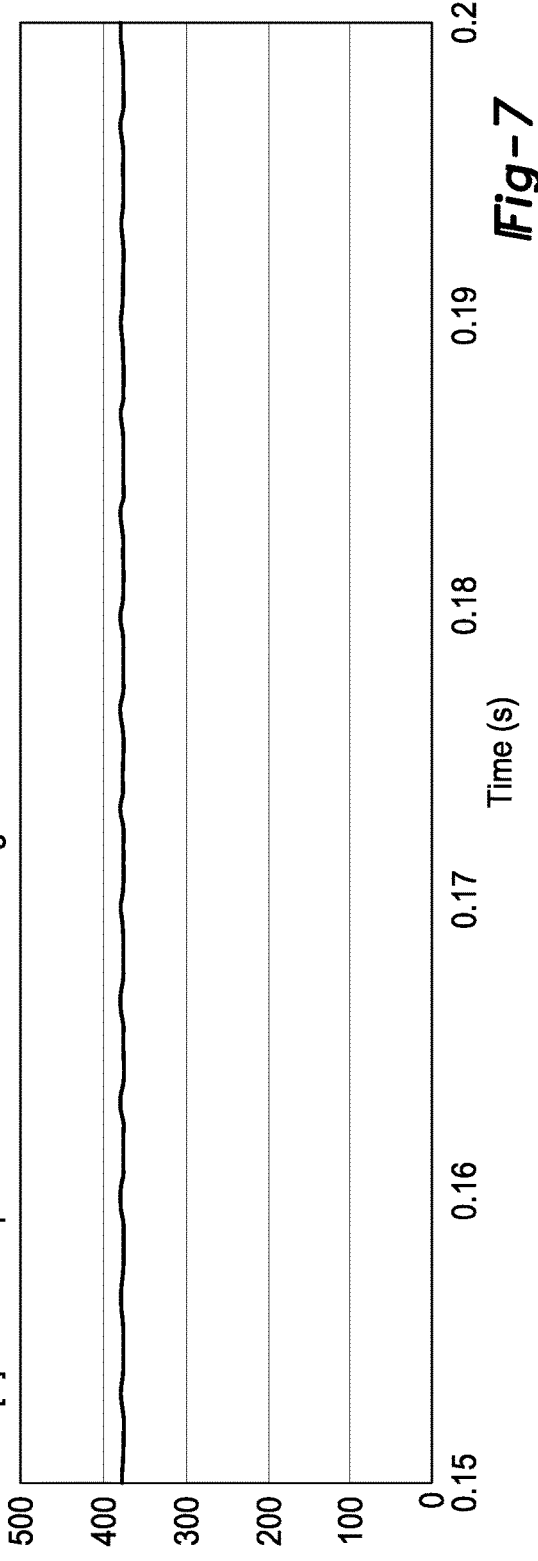
FIG. 7 shows the constant common mode voltage waveform at the neutral point of the electric machine windings of FIG. 5.
Figure 8A:
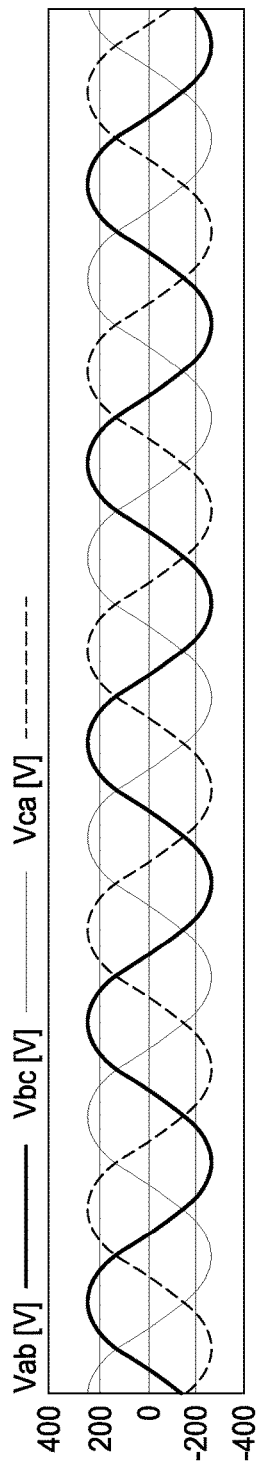
FIGS. 8A, 8B, 8C, and 8D show the phase-to-phase voltage, phase current, battery current, and battery voltage waveforms, respectively, associated with the electric drive system of FIG. 5 while being operated in motoring mode.
Figure 8B:
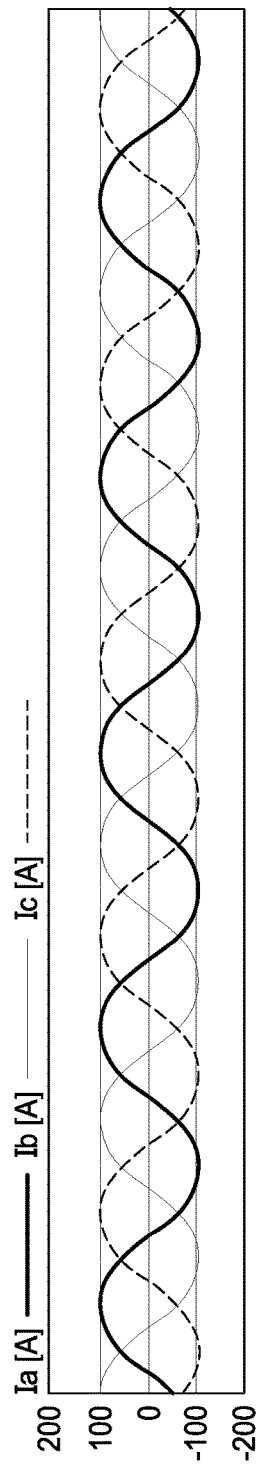
Figure 8C:
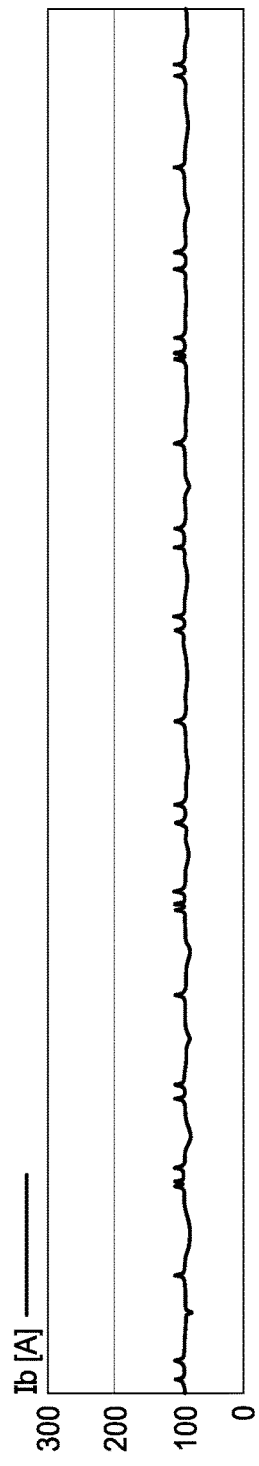
Figure 8D:
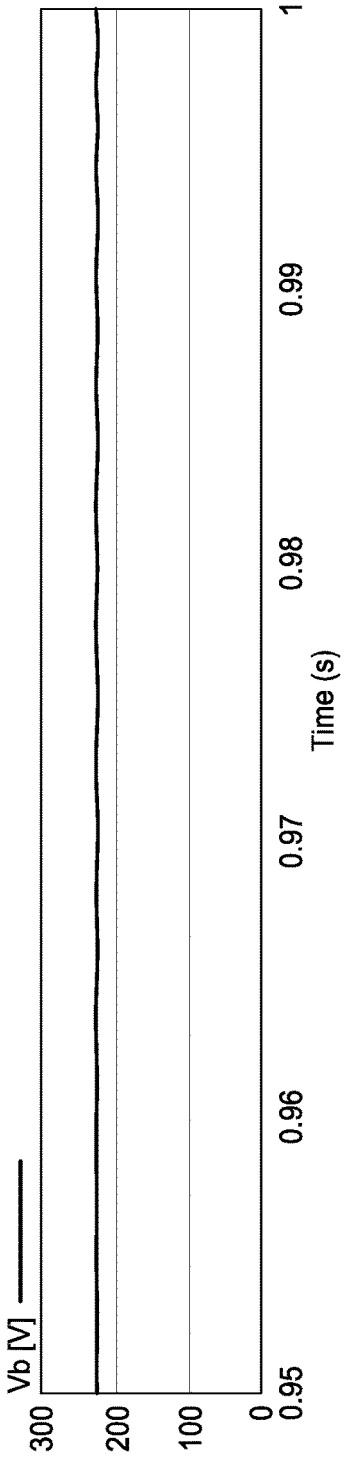
Figure 9A:
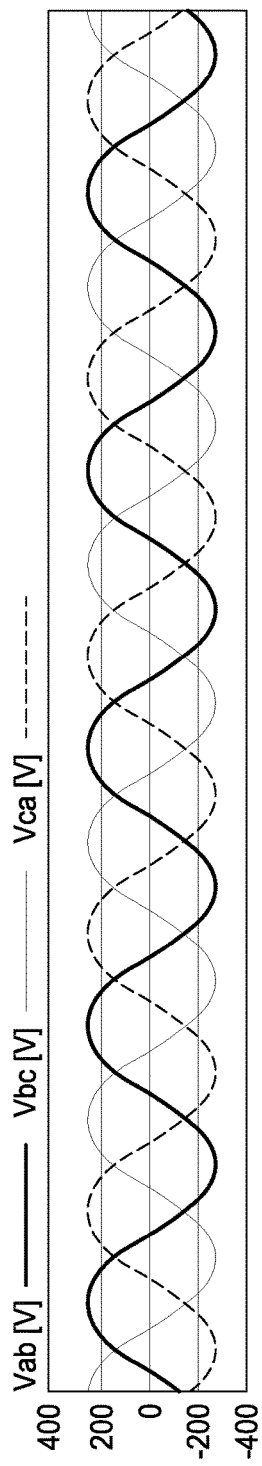
FIGS. 9A, 9B, 9C, and 9D show the phase-to-phase voltage, phase current, battery current, and battery voltage waveforms, respectively, associated with the electric drive system of FIG. 5 while being operated in generating mode.
Figure 9B:
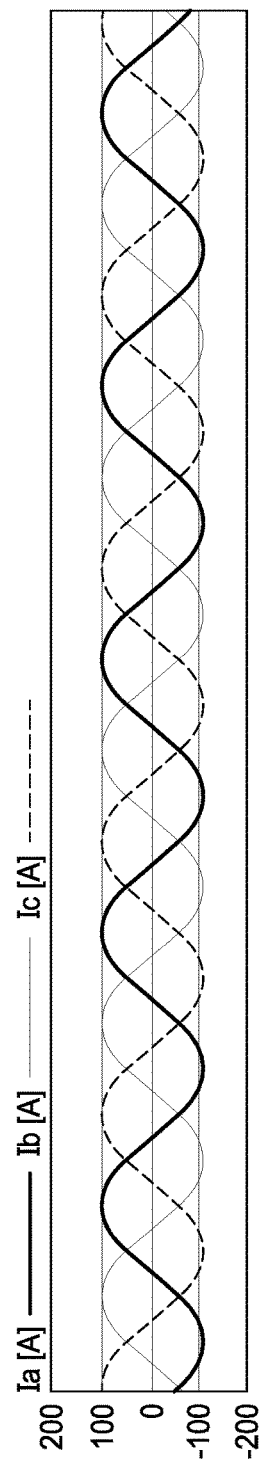
Figure 9C:
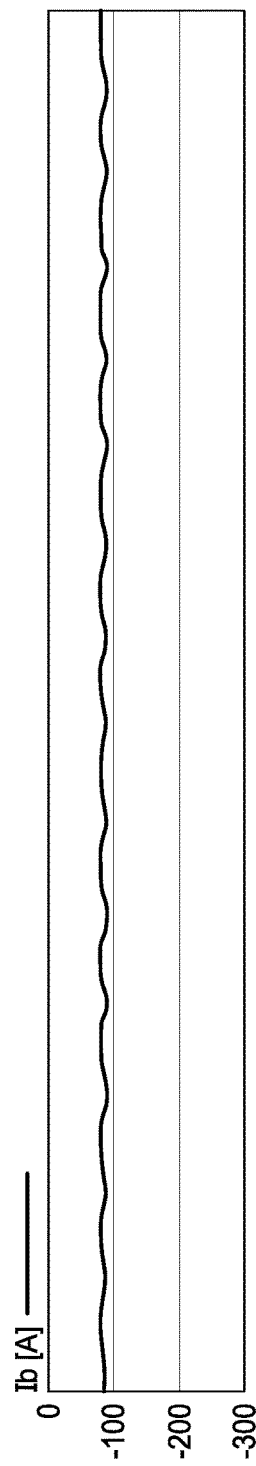
Figure 9D:
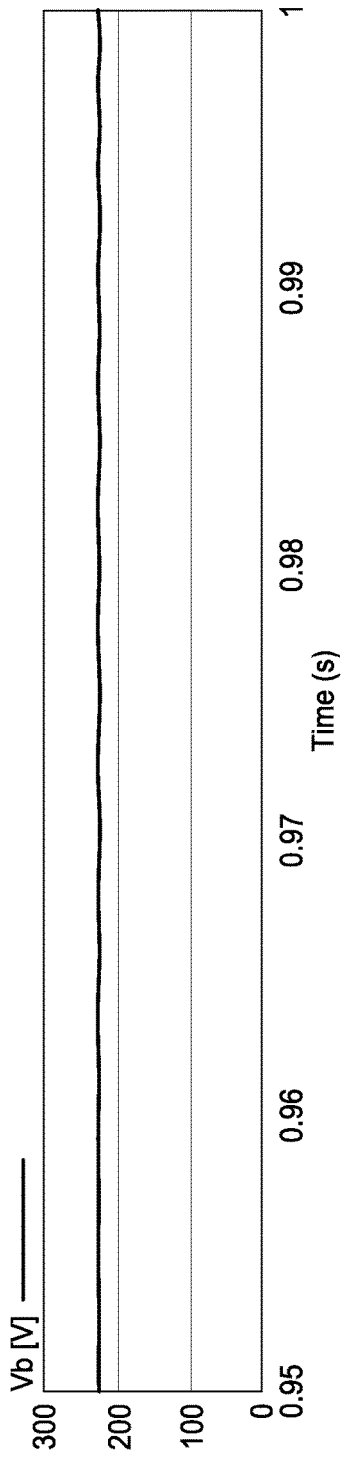

The proposed inverter 93 can achieve smooth three phase sinusoidal output voltages, as shown in FIG. 6. Due to the inverter topology, the common mode voltage (CMV) at the neutral point of the electric machine windings is constant and dv/dt=0, as shown in FIG. 7. As a result, the electric machine 90 does not have significant harmonics related to loss, noise, vibration, harshness, etc., and electromagnetic interference can be reduced or eliminated. Insulation requirements for the electric machine 90 can be lower than those of the electric machines of FIGS. 1 and 2.

The electric drive system 74 is capable of six-step mode operation. The three phase switches S1, S2, S3, S4, S5, S6 can operate in interleaved control mode. Battery current ripple can be reduced because the three phase inductor 82 cancels it out. The capacitor 80 can thus be eliminated in certain designs or have a relatively low capacitance.

The output capacitors 84, 86, 88 can have relatively low capacitance because they allow AC voltage components. Each phase leg of the inverter 93 is a module, which permits the inverter 93 to be implemented through a modularized design.

Silicon carbide metal-oxide semiconductor field-effect transistors are possible candidates for the switches S1, S2, S3, S4, S5, S6 if high switching frequency and high voltage are a requirement. Other transistor switching technology, however, may be used depending on design and performance requirements.

FIGS. 8A through 8D and 9A through 9D show simulation results to verify the proposed electric drive operating in motoring mode and generating mode, respectively. In simulation, the inductance is 30 µH, output capacitance is 50 µF, and switching frequency is 30 kHz. Even though in this example battery voltage is 230V, the inverter phase-to-phase voltages Vab, Vbc, Vca are 260V due to the boosting function. The inverter phase-to-phase voltages Vab, Vbc, Vca, however, could also be less than 230V due to the bucking function. Moreover, the voltages are smooth sinusoidal waveforms. As a result, the electric machine phase currents are quite clean sinusoidal waveforms. These features provide benefits to the electric machine with little to no harmonic related loss associated with noise, vibration, and harshness, and electromagnetic interference, which can lower insulation requirements. The simulated inverter further has bidirectional power flow function: in the motoring mode, the simulated battery discharges at 94A; in the generating mode, the simulated battery charges at 82A.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims.

The words used in the specification are words of description rather than limitation, and it is understood that various changes may be made without departing from the spirit and scope of these disclosed materials. The words controller and controllers, and variations thereof for example, may be interchanged.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   an electric machine;
   an inverter electrically connected between the traction battery and electric machine, wherein the inverter includes three capacitors and three pairs of series connected switches each defining a phase leg and wherein each of the capacitors is in parallel with one of the phase legs and electrically connected between the one of the phase legs and electric machine; and
   a three phase coupled inductor electrically connected between the traction battery and inverter.

2. The vehicle of claim 1, wherein the three phase coupled inductor includes three coils and wherein a terminal of each of the coils is electrically connected between one of the pairs of series connected switches.

3. The vehicle of claim 1 further comprising a capacitor electrically connected in parallel with the traction battery and between the traction battery and three phase coupled inductor.

4. The vehicle of claim 1, wherein during operation of the inverter, a common mode voltage at a neutral point of the electric machine is constant.

5. The vehicle of claim 1 further comprising one or more controllers programmed to operate the switches while phase to phase voltages of the inverter are greater than or less than a voltage of the battery.

6. The vehicle of claim 1, wherein the inverter is configured to permit bidirectional power flow.

7. An automotive electric drive system comprising:
   an inverter including three pairs of series connected switches each defining a phase leg and three capacitors, each of the capacitors being in parallel with one of the phase legs;
   a three phase coupled inductor including three coils, each of the coils including a terminal electrically connected between one of the pairs of series connected switches such that the switches are electrically between the capacitors and three phase coupled inductor; and
   one or more controllers programmed to operate the switches while a voltage input at the three phase coupled inductor is less than a voltage output at the inverter.

8. The automotive electric drive system of claim 7 further comprising a traction battery, wherein the three phase coupled inductor is electrically connected between the inverter and traction battery.

9. The automotive electric drive system of claim 8 further comprising a capacitor electrically in parallel with the traction battery.

10. The automotive electric drive system of claim 7 further comprising an electric machine, wherein the inverter is electrically connected between the three phase coupled inductor and electric machine.

11. The automotive electric drive system of claim 10, wherein during operation of the inverter, a common mode voltage at a neutral point of the electric machine is constant.

12. The automotive electric drive system of claim 7, wherein the inverter is configured to permit bidirectional power flow.

13. The automotive electric drive system of claim 7, wherein the one or more controllers are further programmed to operate the inverter in a six step mode.

14. A vehicle comprising:
   a traction battery;
   an electric machine;
   an inverter electrically connected between the traction battery and electric machine,
   three inductors electrically connected between the traction battery and inverter; and
   one or more controllers programmed to operate the inverter while a common mode voltage at a neutral point of the electric machine is constant.

15. The vehicle of claim 14, wherein the one or more controllers are further programmed to operate the inverter while phase to phase voltages of the inverter are greater than or less than a voltage of the battery.

16. The vehicle of claim 14, wherein the inverter includes three capacitors and three pairs of series connected switches each defining a phase leg and wherein each of the capacitors is in parallel with one of the phase legs and electrically connected between the one of the phase legs and electric machine.

17. The vehicle of claim 14, wherein the three inductors include three coils and wherein a terminal of each of the coils is electrically connected between one of the pairs of series connected switches.

18. The vehicle of claim 14 further comprising a capacitor electrically connected in parallel with the traction battery and between the traction battery and three inductors.

19. The vehicle of claim 14, wherein the inverter is configured to permit bidirectional power flow.

\* \* \* \* \*